(12) United States Patent
Childress et al.

(10) Patent No.: US 7,631,297 B2
(45) Date of Patent: Dec. 8, 2009

(54) AUTONOMIC COMPUTING: MANAGEMENT AGENT UTILIZING ACTION POLICY FOR OPERATION

(75) Inventors: Rhonda L. Childress, Austin, TX (US); Catherine Helen Crawford, Carmel, NY (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 11/098,809

(22) Filed: Apr. 5, 2005

(65) Prior Publication Data

US 2006/0225070 A1 Oct. 5, 2006

(51) Int. Cl.
*G06F 9/44* (2006.01)
*G06F 9/445* (2006.01)

(52) U.S. Cl. .................. 717/120; 717/175; 717/176

(58) Field of Classification Search .............. 717/101, 717/103, 120, 121, 168, 73, 174, 176; 709/220, 709/221, 223, 317; 719/317; 726/1
See application file for complete search history.

(56) References Cited

U.S. PATENT DOCUMENTS

| 5,761,380 | A  | * | 6/1998 | Lewis et al. ............... 706/47 |
| 6,202,207 | B1 | * | 3/2001 | Donohue .................. 717/173 |
| 2002/0100036 | A1 | | 7/2002 | Moshir et al. |
| 2002/0147974 | A1 | * | 10/2002 | Wookey .................... 717/176 |
| 2003/0037327 | A1 | | 2/2003 | Cicciarelli et al. |
| 2003/0163807 | A1 | | 8/2003 | Drake et al. |

* cited by examiner

*Primary Examiner*—Tuan Q Dam
*Assistant Examiner*—Hanh T Bui
(74) *Attorney, Agent, or Firm*—Yee & Associates, P.C.; Jeffrey S. LaBaw

(57) ABSTRACT

Setting up management and monitoring programs on one or more servers is simplified. When a pre-selected monitoring/management vendor is to be used, a general-purpose agent is installed after the vendor agent is installed and can determine the contents of the server(s), then manage additional setup for the vendor agent, such as configurations, best practices, and license management. When the user has not yet determined which vendor or vendors to utilize, a vendor-neutral agent will determine the contents of the server(s) and can then choose between various vendor programs, utilizing weightings according to the strengths and weaknesses of each vendor, as well as user preferences, to determine the best vendor or vendors to select. Any needed vendor agents are then downloaded by the vendor-neutral agent and installed. The vendor-neutral agent also includes the capabilities of the general-purpose agent and manages other setup needs, such as configurations, best practices, and license management.

20 Claims, 5 Drawing Sheets

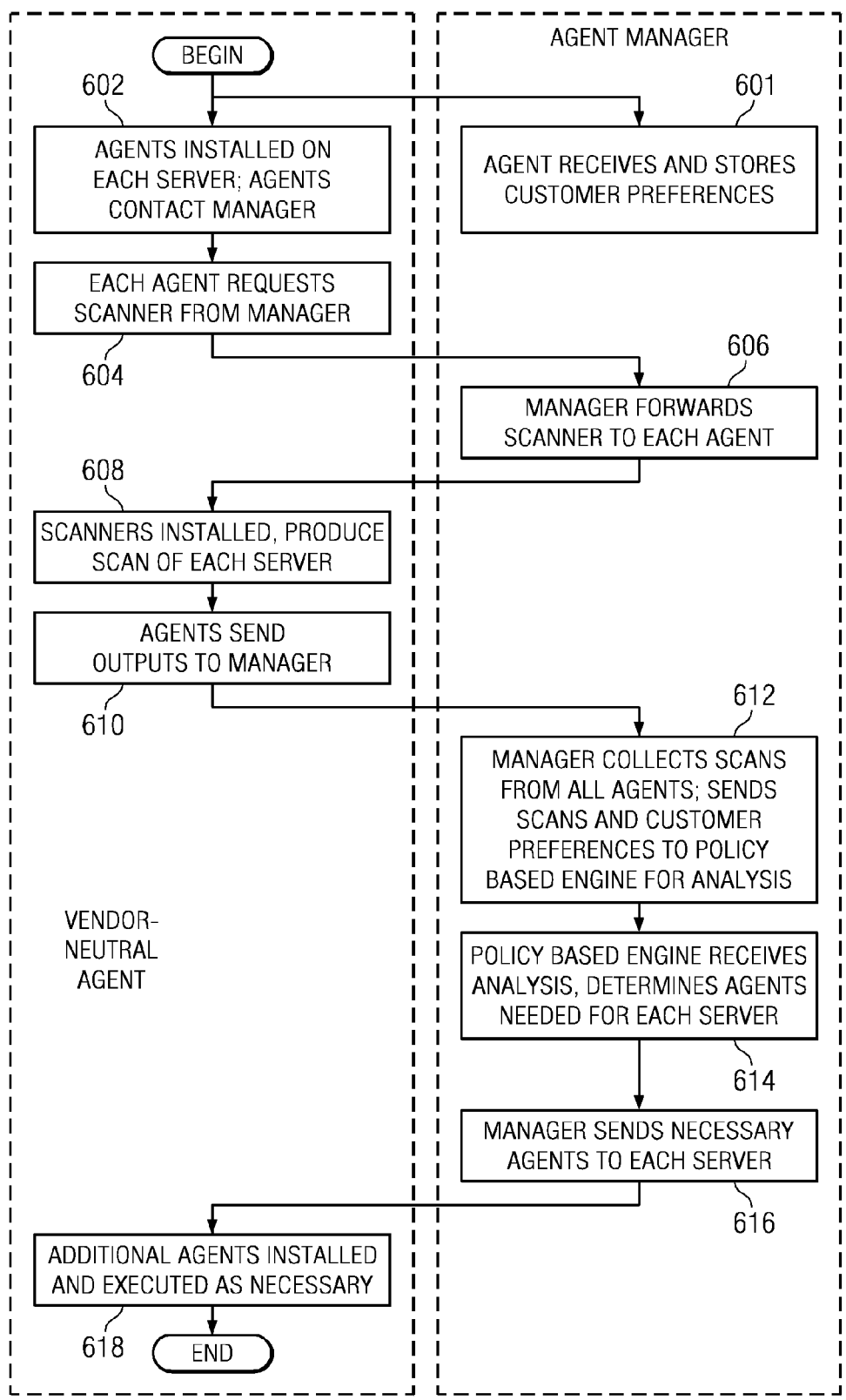

AUTONOMIC COMPUTING: MANAGEMENT AGENT UTILIZING ACTION POLICY FOR OPERATION

BACKGROUND OF THE INVENTION

1. Technical Field

This application relates generally to providing computer services in a timely and economical manner by managing the initialization of monitoring and management software. More specifically, the application relates to a system, method, and software to quickly determine the configuration of a server, to receive and install monitoring and management components, if needed, and to manage initialization and configuration of the monitoring/management agents as necessary.

2. Description of Related Art

The management of computer resources in a company can involve large amounts of time and energy. Any time an employee is added, moved, or dropped, the system must be updated to reflect the desired availability of resources to each person. Additionally, files grow larger in both size and complexity, software is updated, and hardware is added or replaced. To automate the process, several vendors offer management systems that manage a wide variety of hardware and software resources according to stated policies. In a typical management system, various agents, or programs, act within a given infrastructure to monitor and provide management instructions to the resources present. As policies change or a patch is made available, a systems administrator works through the management system to provide the updates automatically to all affected servers.

There can be a number of instances when it is desirable to change the monitoring/management programs utilized on a system, such as after a merger, acquisition, or outsourcing of a system. Updates of existing management programs or the availability of new management programs may also create the impetus for change. Such a change requires the systems administrator to know what resides on a system to provide the proper configurations and settings. In some instances, the systems administrator may also need to determine the best management or monitoring programs to serve their needs. Performing discovery, installation, and setup on the new system can be tedious and difficult if done manually, particularly in very large, complex systems. Furthermore, choosing the best among the numerous available management programs can require a great deal of knowledge. Consequently, it requires a great deal of time to acquire such knowledge on the part of the already busy, time constrained systems administrator.

The advent of grid computing as only exacerbated the problem. It is nearly impossible for the system administrator to know what applications are on what system at a given point of time as the grid is so dynamic. Even after a scan of the resident applications, the scan becomes "stale" in a matter of hours and of limited utility.

Therefore, it would be desirable to provide an automated means for discovering the programs, and in particular the monitoring and management programs, on the machines in a distributed computing system and for automatically installing and configuring monitoring and management programs.

SUMMARY OF THE INVENTION

A system, method, and computer program is disclosed that simplifies setting up management and monitoring programs on one or more servers. A first embodiment of the invention, known as a general-purpose agent, is used when a pre-selected monitoring/management vendor is to be used. That is, the systems administrator has already chosen the appropriate monitoring/management software. The general-purpose agent is installed after the vendor monitoring/management agent is installed and can determine the contents of the server(s), then manage additional setup for the vendor agent, such as configurations, best practices, and license management. A second embodiment of the invention, known as a vendor-neutral agent, is utilized when the user has not yet determined which vendor or vendors to utilize. The vendor-neutral agent will determine the contents of the server(s) and can then choose between various vendor programs, utilizing weightings according to the strengths and weaknesses of each vendor program, as well as user preferences, to determine the best vendor program or programs, which may be offered by different vendors, to select. Any needed vendor agents are then downloaded by the vendor-neutral agent and installed. The vendor-neutral agent also includes the capabilities of the general-purpose agent and manages other setup needs, such as configurations, best practices, and license management.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts the flow of operation for the vendor-neutral version, according to an exemplary embodiment of the invention.

DETAILED DESCRIPTION OF THE PREFERRED EMBODIMENT

Figure 1:
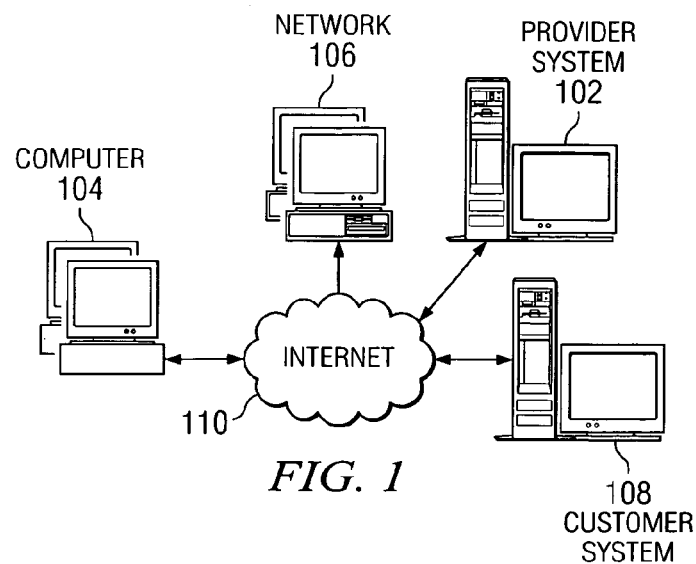
FIG. 1 depicts a system that can be used to implement the disclosed agents, according to an exemplary embodiment of the invention.

FIG. 1 depicts a portion of the Internet 110, to which are attached a service provider system 102, computer 104, network 106, and customer system 108, as well as other resources that are not shown. Provider 102 is able to provide management resources to customer system 108 over the Internet 110. Customer system 108 can assume many different configurations that can be set up with monitoring by the present invention.

Figure 2:
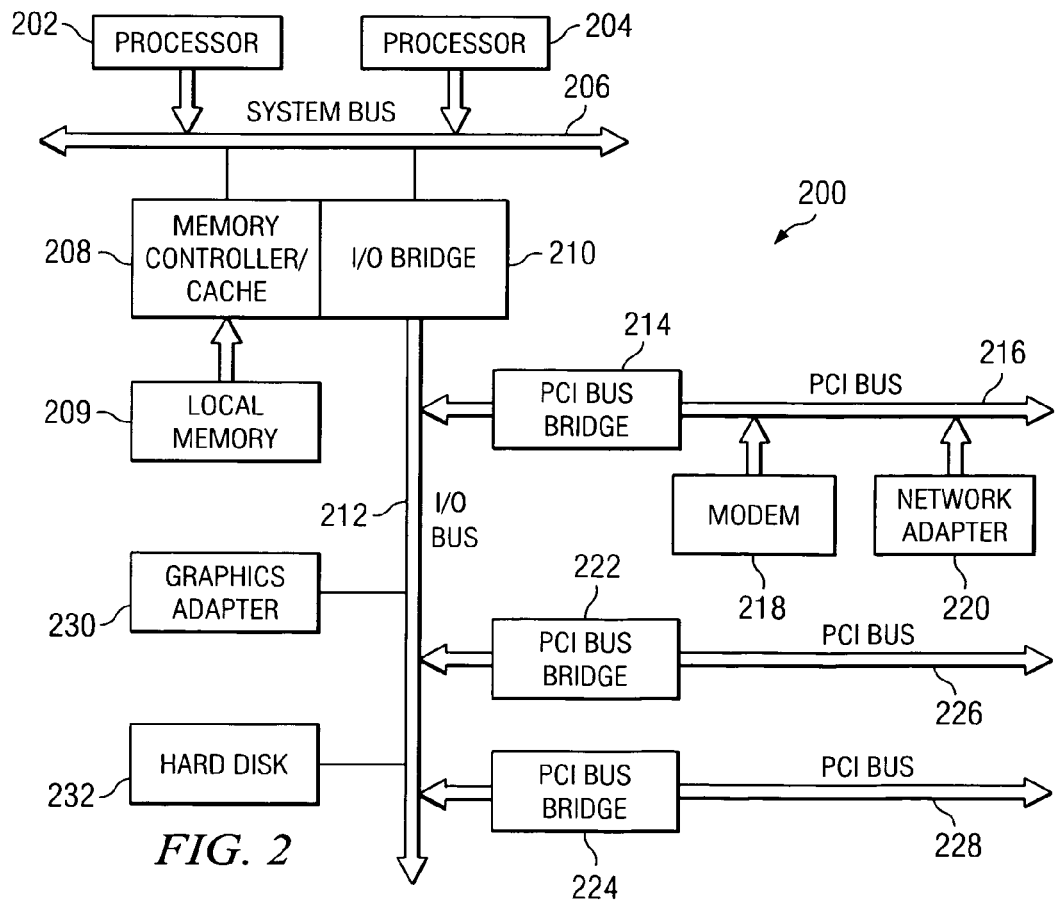
FIG. 2 depicts a block diagram of a data processing system that may be implemented as a server.

Referring to FIG. 2, a block diagram of a data processing system 200 that may be implemented as a server in a system is depicted in accordance with a preferred embodiment of the present invention. Data processing system 200 can be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

General Purpose Agent

Figure 3:
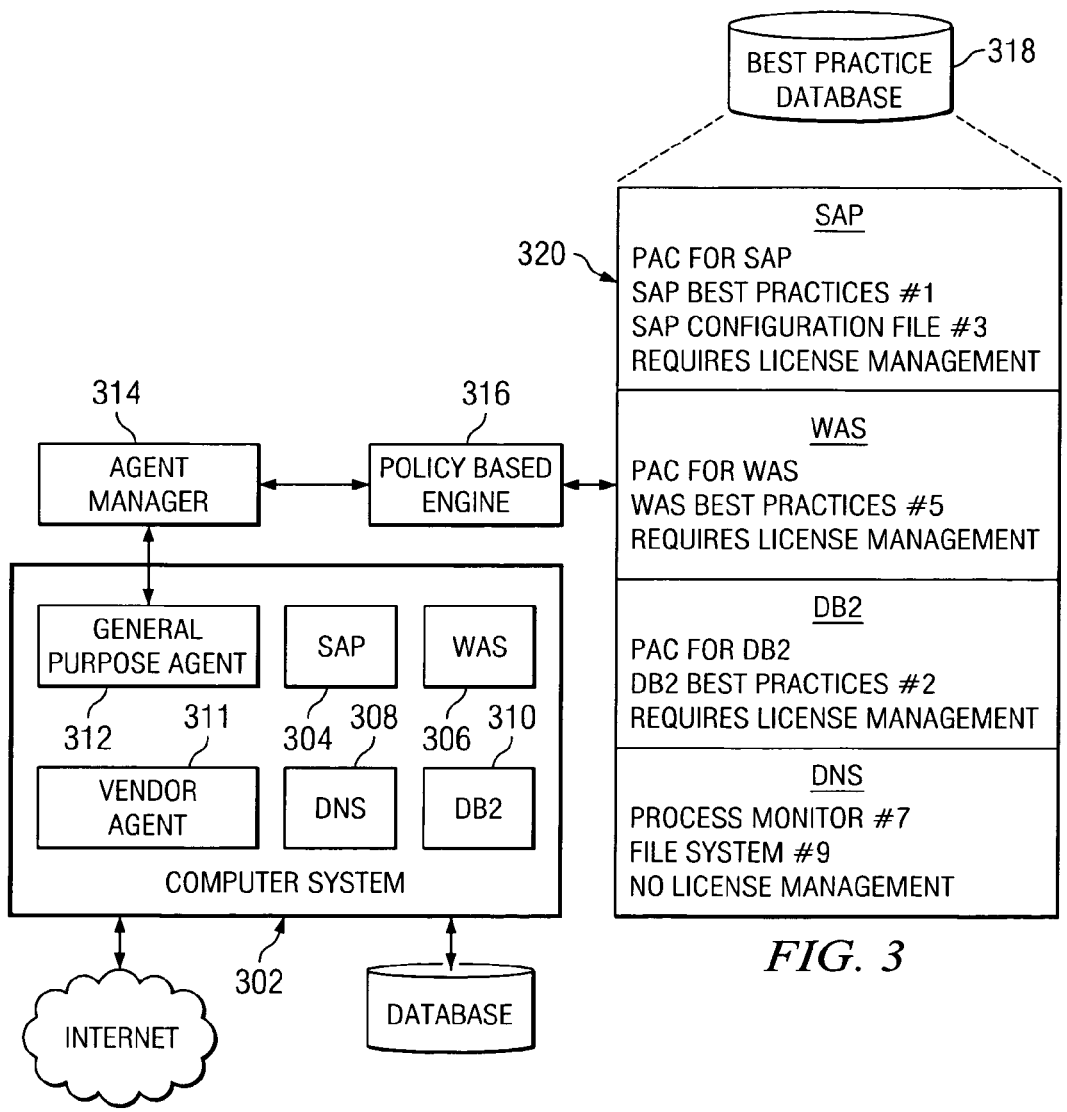
FIG. 3 depicts the elements used with the general-purpose agent, according to an exemplary embodiment of the invention.

FIG. 3 depicts the elements used with the general-purpose agent, according to an exemplary embodiment of the invention. For example, customer system 108 contracts with provider 102 of FIG. 1, specifying that a specific vendor's monitoring/management product be used. Exemplary vendors for monitoring/management products are International Business Machines of Armonk, N.Y. and BMC Software, of Houston, although many other vendors also produce this type of products. This exemplary embodiment will be explained with reference to monitoring and management products by Tivoli, a division of International Business Machines, Inc. Computer system 302 can be, for example, a server or group of servers, such as the server shown in FIG. 2. The system can be configured as a multiprocessing server with a number of programs running on it, a network of dedicated servers, or a combination of dedicated and multi-processing servers. In this example, computer system 302, which is connected to the Internet, is a multi-processing server contains four applications that will be monitored by Tivoli. The applications are (1) SAP 304, an integration application platform available from SAP America, Lester, Pa., (2) WebSphere® Application Server (WAS) 306, a product of International Business Machines of Armonk, N.Y., (3) Domain Name Server (DNS) 308, a program that communicates with other DNS programs on the Internet to resolve user addresses, and (4) DB2® 310, a database product of International Business Machines.

General-purpose agent (GPA) 312 is installed on system 302, either when the operating system is deployed or when the system administrator determines that the agent is needed. Since this embodiment is designed to work with the monitoring/management programs of a specific vendor, the monitoring/management program to be used on the server is shown as vendor agent 311. Vendor agent 311 may have been installed prior to the operation of GPA 312. Alternatively, GPA 312 can install vendor agent 311, which will perform the actual management and monitoring needed for the applications on this server. In either case, it is necessary to know the preferred policies and configurations, as well as determining whether a license is needed for vendor agent 311.

In the presently preferred embodiment, general-purpose agent 312 is written in Perl® (Practical Extraction and Report Language) or in Java®, an object oriented programming language that is movable from one machine to another. Both of these languages are commonly available on a wide variety of machines At installation, GPA 312 contains the address of agent manager 314, so that when GPA 312 begins execution, it is able to immediately contact agent manager 314. In the preferred embodiment, the agent manager maintains an inventory of servers being managed by associated agents; at any time that the address of the agent manager is changed, the associated agents are provided a new address at which to contact the agent manager. Agent manager 314 is able to provide scanners and additional agents to the system as needed. Additionally, agent manager 314 communicates with policy-based engine 316. Policy-based engine 316 can access a best practice database 318, which contains guidelines according to industry or vendor standards, regarding the specific practices and configurations needed to monitor/manage various applications. The policies or rules in the database can be created by means of an expert system or a similar tool. A sample of the rules found on the best practice database 318 is shown in box 320. The sample rules include the following:

(1) if the server contains SAP, then
   (a) use Proactive Analysis Component (PAC) (a product of IBM Tivoli®),
   (b) use SAP best practices file #1 (for instructions on what elements should be monitored),
   (c) use SAP software configuration file #3 (to set the configuration of various settings within SAP), and
   (d) a license is required and must be managed;
(2) if the server contains WAS, then
   (a) use PAC,
   (b) use WAS best practices file #5, and
   (c) a license is required and must be managed;
(3) if the server contains DNS, then
   (a) use process monitor #7, and
   (b) use file system #9 (no license required)
(4) if the server contains DB2, then
   (a) use PAC,
   (b) use DB2 best practices file #2, and
   (c) a license is required and must be managed.

Agent manager 314 and policy-based engine 316 can be instantiated on a single server, such as a server in provider system 102 of FIG. 1, although they can also be on separate servers. Likewise, best practices database 318 is preferably available from a central location, such as a storage unit in provider system 102. Those skilled in the art would understand that the preceding rules are merely exemplary, and that many other rules could be present in the best practice database 318. Furthermore, the database 318 can be extended to include user or organization preferences that can override the "best practice" policies of the industry at large.

Figure 4:
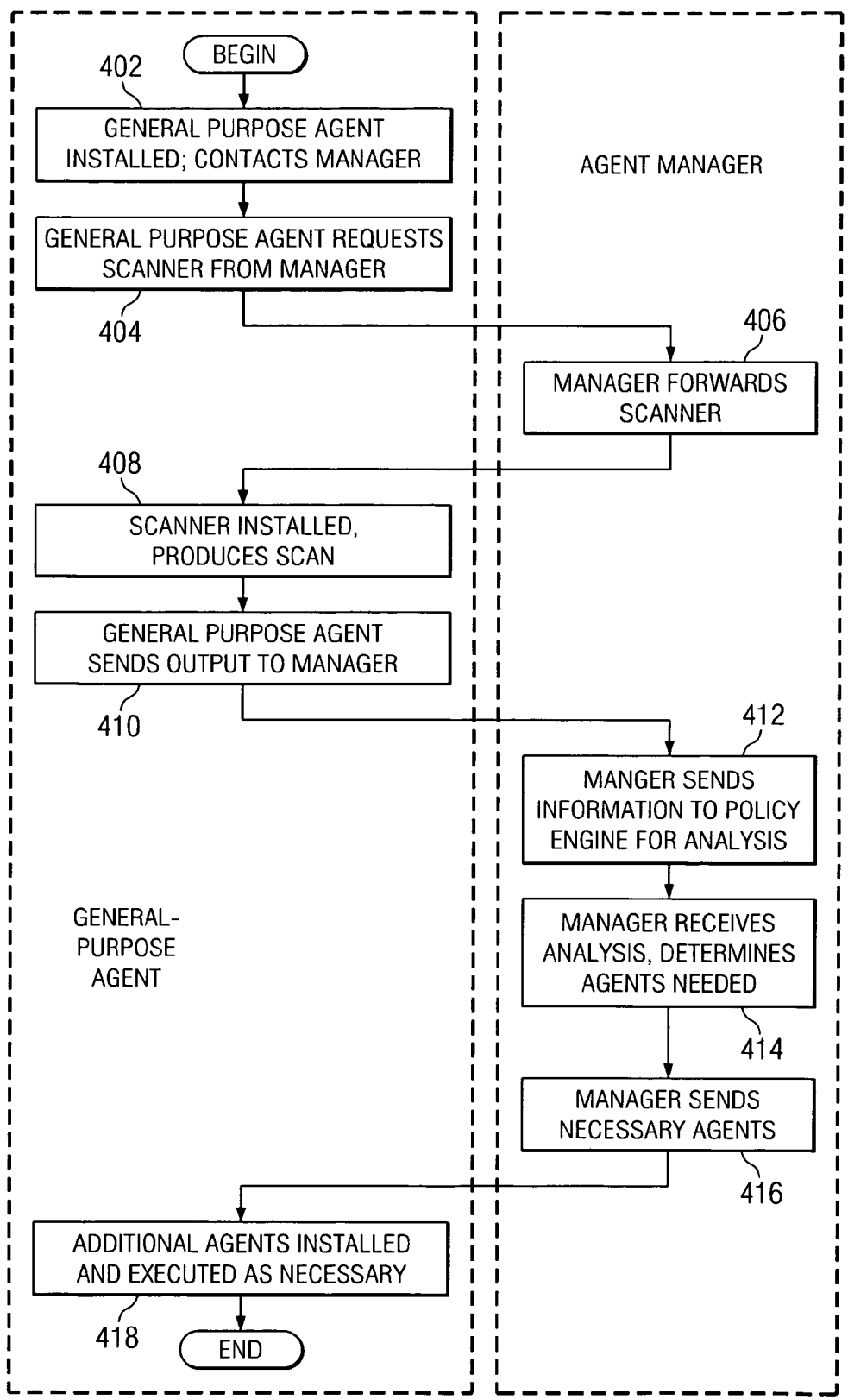
FIG. 4 depicts the flow of operation for the general-purpose agent, according to an exemplary embodiment of the invention.

FIG. 4 depicts the flow of operations for the general-purpose agent, in accordance with a preferred embodiment of the present invention. The process begins with GPA 312 being installed on system 302. At the time of installation, general-purpose agent 312 is given the address of agent manager 314, which oversees the process. As soon as GPA 312 is executed, it contacts agent manager 314 (step 402). Initially, GPA 312 requests a generalized scanner, which is able to manage a variety of systems, from agent manager 314 (step 404). Agent manager 314 responds by sending a scanner (step 406). GPA 312 will install the scanner and cause it to scan a server comprising system 302 (step 408). In the presently preferred embodiment, the scan is produced as an XML file, which is then sent to the agent manager 314 (step 410). A sample scan is shown below.

```
<?xml version="1.0" encoding="UTF-8"?>
<INVENTORY_SCAN DATE="xx/xx/xxxx" TIME="xx:xx:xx">
    <SCAN_TARGET ID="801" ADDRESS="10.1.1.1">
        <APPLICATION_DISCOVERED ID="001">
            <APPLICATION_NAME>
                Websphere Application Server
            </APPLICATION_NAME>
            <APPLICATION_VERSION>
                5.1
            </APPLICATION_VERSION>
        </APPLICATION_DISCOVERED>
        <APPLICATION_DISCOVERED ID="002">
            <APPLICATION_NAME>
                IBM DB2 Database Server
            </APPLICATION_NAME>
            <APPLICATION_VERSION>
                8.1
            </APPLICATION_VERSION>
        </APPLICATION_DISCOVERED>
        <APPLICATION_DISCOVERED ID="003">
            <APPLICATION_NAME>
                Domain Name Server
            </APPLICATION_NAME>
            <APPLICATION_VERSION>
                4.9
            </APPLICATION_VERSION>
        </APPLICATION_DISCOVERED>
        <APPLICATION_DISCOVERED ID="004">
            <APPLICATION_NAME>
                SAP
            </APPLICATION_NAME>
            <APPLICATION_VERSION>
                7.2
            </APPLICATION_VERSION>
        </APPLICATION_DISCOVERED>
    </SCAN_TARGET>
</INVENTORY_SCAN>
```

Agent manager 314 forwards the information from the XML file to policy-based engine 316 for analysis (step 412). Once policy based engine (PBE) 316 determines the applications currently installed on system 302, PBE can access best practice database 318 to determine the setup agents and settings necessary to initialize vendor agent 311 (step 414). PBE 316 notifies agent manager 314 of needed agents and agent manager 314 is then able to push the appropriate agents down to general-purpose agent 312 (step 416). In this example, the files found at 320 are sent to the system, along with appropriate agents for instantiating the desired settings and configurations. As the final step, general-purpose agent 312 oversees the installation of the appropriate agents and the initialization of settings and configurations as directed by agent manager 314 (step 418). The process is then complete.

Although this process up to this point has been described as a one-time process, once GPA 312 has been installed, this program 312 can be triggered periodically to ensure that the system continues to be updated with current settings and configurations, as desired by management. Using this method and system, an automated program can replace a great deal of human effort, removing much of the tedium from the installation and maintenance of management/monitoring programs.

Vendor-Neutral Agent

As systems grow more complex, it can be more difficult to determine the best vendor for the given system. In this embodiment of the invention, the user can specify desired limitations, but allow the system to determine the best monitoring product or products using a vendor-neutral database, as will be described. In this version, separate vendor-neutral agents will be sent to each server in the system for discovery and installation, although the decisions will be made looking at the overall system and the user constraints.

Figure 5:
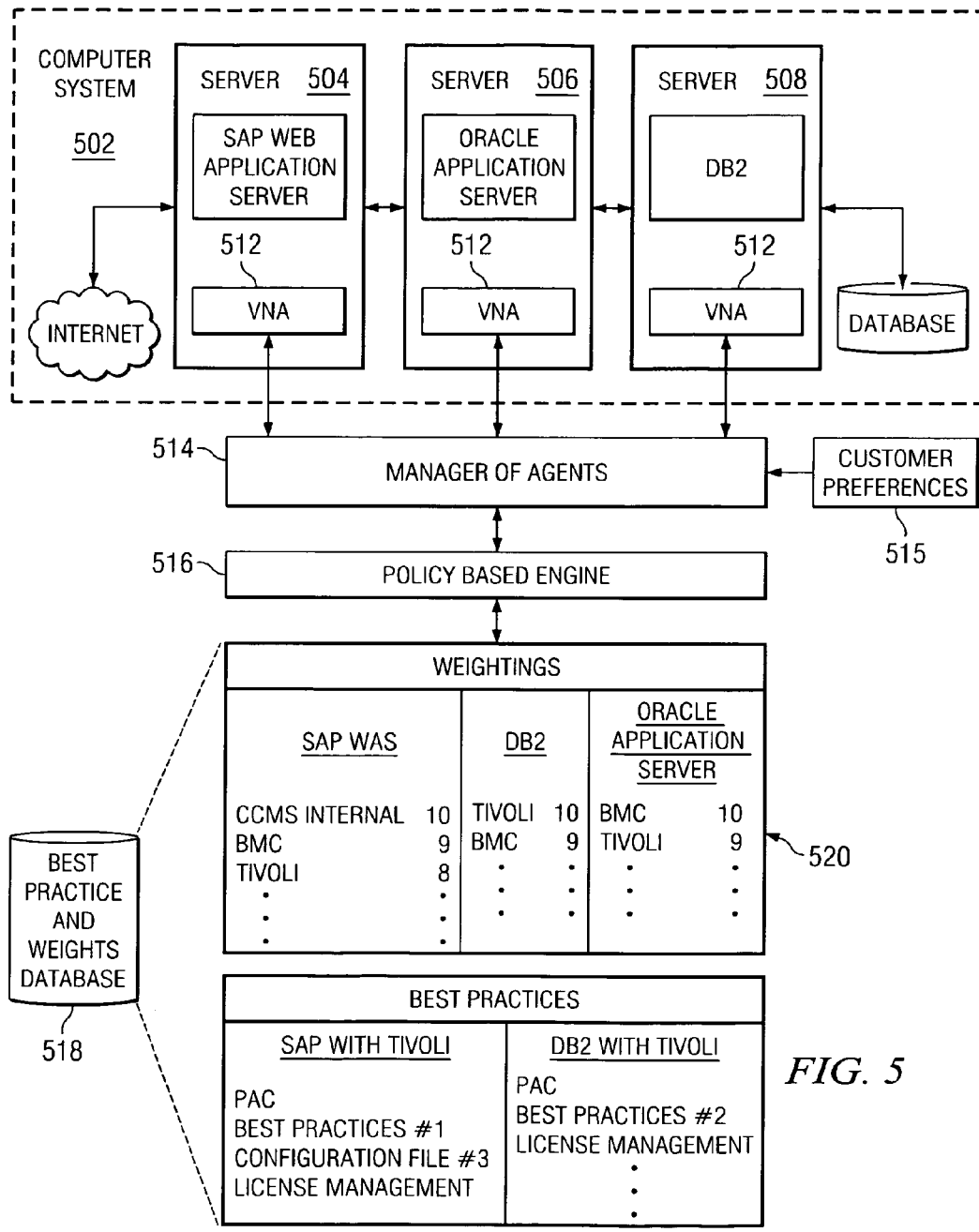
FIG. 5 depicts the elements used with the vendor-neutral version, according to an exemplary embodiment of the invention.

FIG. 5 depicts the elements used in an exemplary embodiment of the vendor-neutral version of the invention. In this example, computer system 502 has three dedicated servers 504, 506, and 508, each of which will receive a copy of vendor-neutral agent (VNA) 512. Like the general-purpose agent 312, vendor-neutral agent 512 is preferably written in Perl or in Java. In this exemplary embodiment, server 504 contains SAP Web Application Server, server 506 contains Oracle Application Server, and server 508 contains DB2. Because VNA 512 will be choosing the best vendor agent, the vendor agent is not yet present on the server.

Again, there is a manager of agents 514 and a policy-based engine 516. There is also a combined policy and weightings database 518. In addition to the "best practices", database 518 contains weightings for each of the monitoring/management programs that can be used with each server application. For example, under SAP Web Application Server, the database 518 shows three exemplary monitoring programs that are available to monitor this application: CCMS Internal is rated a 10 (the highest rating); when used with SAP Web Application Server, BMC is rated a 9; and Tivoli is rated an 8; other ratings exist for monitoring programs used with Oracle Application Server and DB2. Database 518 also contains similar information as was shown in best practice database 318, although this information is provided for each of the multiple vendors supported, rather than for a single vendor. The customer can also provide their preferences 515 for vendor agents used. Exemplary choices can be (a) the best tool to monitor each server, (b) the single vendor that provides the best overall monitoring for all of the existing applications, or (c) a specific vendor, as long as they are in the top three vendors for each application to be monitored. In this manner, the customer can express a preference without having to personally check each server. The preferences 515 can alternatively be expressed as weightings in the database 518. Although database 518 is shown here as a centralized database, it is not required. Preferably the information regarding weightings and best practices are easily accessible by policy based engine 516; but they can be stored at different locations and maintained by different entities.

FIG. 6 depicts the flow of operations for the vendor neutral agent, in accordance with a preferred embodiment of the present invention. The process begins with the vendor-neutral agent (VNA) 512 being installed on each server in computer system 502, e.g., servers 504, 506, 508. At the same time, the agent manager also receives user preferences (step 601). At the time of installation, each VNA 512 is given the address of agent manager 514. As each VNA 512 begins execution, it contacts agent manager 514 (step 602). Initially, each VNA 512 requests a scanner from agent manager 514 (step 604). Agent manager 514 responds by sending a scanner to each agent 512 (step 606). VNA 512 will install the scanner and cause it to scan the server it resides on (step 608). Again, a scan is produced in XML and sent to the agent manager 514 (step 610), as shown below.

```xml
<?xml version="1.0" encoding="UTF-8"?>
<INVENTORY_SCAN DATE="xx/xx/xxxx" TIME="xx:xx:xx">
    <SCAN_TARGET ID="801" ADDRESS="10.1.1.1">
        <APPLICATION_DISCOVERED ID="001">
            <APPLICATION_NAME>
                ORACLE Application Server
            </APPLICATION_NAME>
            <APPLICATION_VERSION>
                9.0
            </APPLICATION_VERSION>
        </APPLICATION_DISCOVERED>
    </SCAN_TARGET>
</INVENTORY_SCAN>
```

Where the multi-processing operating system contains a number of dedicated servers, the scans from the agents on dedicated servers will contain only their single application. It will be necessary to have scans from all of the agents in order to proceed. Alternatively, the agent manager 514 can be instructed to proceed when a given percentage of the servers have responded.

Agent manager 514 forwards the information from the XML files for each server and from customer preferences 515 to policy-based engine 516 for analysis (step 612). Policy based engine (PBE) 516 then determines the applications currently installed on system 502 and accesses best practice database 518 to determine the monitoring/management programs necessary to manage system 502 (step 614). Using the scans, customer preferences 515, and database 518, PBE 516 determines the desired monitoring program and configuration for each server. For example, given the weightings shown and the three customer choices presented earlier, a customer choosing (a) a best tool for each server would be given CCMS for server 504, BMC for server 506, and Tivoli for server 508; a customer choosing (b) a single best tool would receive Tivoli on all three servers 504, 506, 508, because of the cumulative score; and a customer choosing (c) BMC as long as it was in the top three choices would receive BMC on all three servers 504, 506, 508. Once a decision is made, policy-based engine 516 also determines best practice files to accompany each monitoring program.

PBE 516 notifies agent manager 514 of needed programs and agent manager 514 is then able to push the appropriate agents down to each of the vendor-neutral agents 512 on servers 504, 506, 508 (step 616). As the monitoring programs are sent, so also are the various configuration files that specify the best practices. As the final step, each vendor neutral agent 512 oversees the installation and configuration of the monitoring/management agents as directed by agent manager 514 (step 618). The process is then complete.

It is worth noting that if, in the exemplary embodiment of FIG. 5 and FIG. 6, one of the servers is a multiprocessor running several applications, the vendor neutral embodiment can decide to install several monitoring/management agents on that server to monitor the various applications. This decision will depend not only on the applications running on the server, but also on the weightings and user preferences, as do the other decisions. It is also possible to break out parts of the system, such as license management, in order to easily supplement existing options.

The advantages of this system are numerous. Most basically, automating the process allows monitoring to be quickly installed on a system without tedious searching and decision-making by administrators. The use of a policy-based engine allows different policies for different clients or situations, without the need to change coding in any way. Any of the databases, such as best practices, weightings, and best configuration, as well as user preferences, can be dynamically updated without affecting the rest of the system. As new versions of the management/monitoring software become available, the GPA or VNA can be utilized to instantiate the new software. The general-purpose agent is very simple, with its only purpose being to download and execute programs and to return information, yet at the same time it is flexible, since its programming language allows it to run under many different operating systems. Thus, the disclosed invention allows the task of setting up new monitoring programs to be handled quickly, easily, and with little error.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An installation management system, comprising at least one processor and further comprising:
   a management program containing management elements capable of providing monitoring and management for a plurality of applications;
   a set of policies for use in conjunction with said plurality of applications, said set of policies containing, for each application supported, information regarding a respective management element of said management program;
   a policy-based engine connected to use knowledge of the content of a server and said set of policies to determine needed ones of said management elements for the server;
   an agent configured to run on the server; and
   an agent manager configured to act as an interface between said policy-based engine and said agent and to download programs to said agent;
   wherein said agent contains an address of said agent manager and is further configured to request a scanner from said agent manager,
   to install and execute said scanner, and to pass an output of said scanner to said agent; and
   wherein said agent is a vendor-neutral agent and further comprising a set of weightings that provides, for each application supported, (a) a list of management programs from a plurality of vendors that are available to manage said application and (b) a respective weighting value.

2. The installation management system of claim 1, wherein said policy-based engine is adapted to notify said agent manager that one or more additional agents are needed at said server, and said agent manager is adapted to move each of said additional agents down to said agent configured to run on said server.

3. The installation management system of claim 1, wherein said policy-based engine is adapted to determine applications that are currently installed on said server.

4. The installation management system of claim 1, wherein said agent manager is further configured to pass said output of said scanner to said policy based engine.

5. The installation management system of claim 1, wherein said agent is specific to a given vendor and said set of policies contains information regarding management programs specific to the given vendor.

6. The installation management system of claim 1, wherein said agent is a vendor-neutral agent and further comprising a set of weightings that provides, for each application supported, (a) a list of management programs from a plurality of vendors that are available to manage said application and (b) a respective weighting value.

7. The installation management program of claim 6, wherein each respective weighting value provides a judgment of the suitability of the combination of management program and application.

8. The installation management program of claim 6, wherein said vendor-neutral agent is further configured to receive a preferred management program chosen according to said set of weightings and a user preference and to instantiate said preferred management program on the server.

9. The installation management program of claim 6, wherein said policy-based engine is able to choose a plurality of preferred management programs for the server, if not constrained by said user preference.

10. The installation management program of claim 6, wherein said agent can be instantiated on a plurality of servers forming a network and said agent manager provides respective scanners to all instantiations and receives the output from said respective scanners.

11. A method for managing a server, comprising the steps of:
maintaining a set of policies containing, for each application supported, respective information regarding an associated management element, preferred practices, preferred configurations, and a need for a license;
installing an agent on the server, said agent being provided with an address that is usable to contact an agent manager;
operating said agent to request a scanning program from said agent manager, wherein said scanning program is capable of providing an inventory, said inventory containing a list of applications installed on the server;
operating said agent manager, in response to said request for said scanning program from said agent, to provide said agent with said scanning program;
using said inventory and said set of policies to determine one or more elements from a group including at least a needed management element, preferred practices, preferred configurations, and a need for a license for the server; and
forwarding said preferred practices and preferred configurations and, if not already present, said needed management element, to said agent for instantiation on the server.

12. The method of claim 11, wherein a policy-based engine accesses said set of policies using said inventory to determine said needed management element.

13. The method of claim 11, wherein said agent remains on the server and can be invoked when said set of policies changes.

14. The method of claim 11, wherein said agent is capable of choosing among a plurality management elements produced by different vendors and further comprising maintaining a set of weightings, said set of weightings containing, for each application supported, a list of available management elements and respective weighting values associated with said management elements.

15. The method of claim 14, further comprising using said inventory, said set of weightings, and a user preference to determine a first preferred management program for the server and forwarding said first preferred management program to said agent for installation on the server.

16. The method of claim 15, wherein said using-to-determine step further determines a second preferred management program for the server, wherein said first preferred management program is instantiated to manage a first group of applications on the server and said second preferred management program is instantiated to manage a second group of application on the server.

17. A computer program product having executable instructions stored on a computer recordable storage medium, said instructions being executable and said computer program product comprising:
first instructions for maintaining a set of policies used in conjunction with a plurality of applications, said set of policies containing, for each application supported, respective information regarding management elements, preferred practices, preferred configurations, and a need for a license;
second instructions for installing an agent on the server, said agent being provided with an address that is usable to contact an agent manager;
third instructions for operating said agent to request a scanning program from said agent manager, wherein said scanning program is capable of providing an inventory, said inventory containing a list of applications installed on the server;
fourth instructions for operating said manager, in response to said request for said scanning program from said agent, to provide said agent with said scanning program;
fifth instructions for using said inventory and said set of policies to determine one or more elements from a group including at least needed management elements, preferred practices, preferred configurations, and a need for a license for the server; and
sixth instructions for forwarding said needed management elements, preferred practices, preferred configurations, and a need for a license to said agent for instantiation on the server.

18. The computer program product of claim 17, further comprising:
sixth instructions for maintaining a set of weightings, said set of weightings containing, for each application supported, a list of available management programs and respective weighting values associated with said management programs;
seventh instructions for using said inventory, said set of weightings, and a user preference to determine a first preferred management program for the server;
eighth instructions for forwarding said first preferred management program to said agent for installation on the server.

19. The computer program product of claim 17, wherein the instructions are downloaded over a network from a remote data processing system.

20. The computer program product of claim 17, wherein the instructions are downloaded over a network to a remote data processing system.

* * * * *

UNITED STATES PATENT AND TRADEMARK OFFICE
CERTIFICATE OF CORRECTION

PATENT NO. : 7,631,297 B2 Page 1 of 1
APPLICATION NO. : 11/098809
DATED : December 8, 2009
INVENTOR(S) : Childress et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Second Day of November, 2010

David J. Kappos
*Director of the United States Patent and Trademark Office*